Dec. 9, 1952 H. CHIREIX 2,621,325
PLURAL MODULATION MULTIPLEX SYSTEM
Filed July 30, 1947
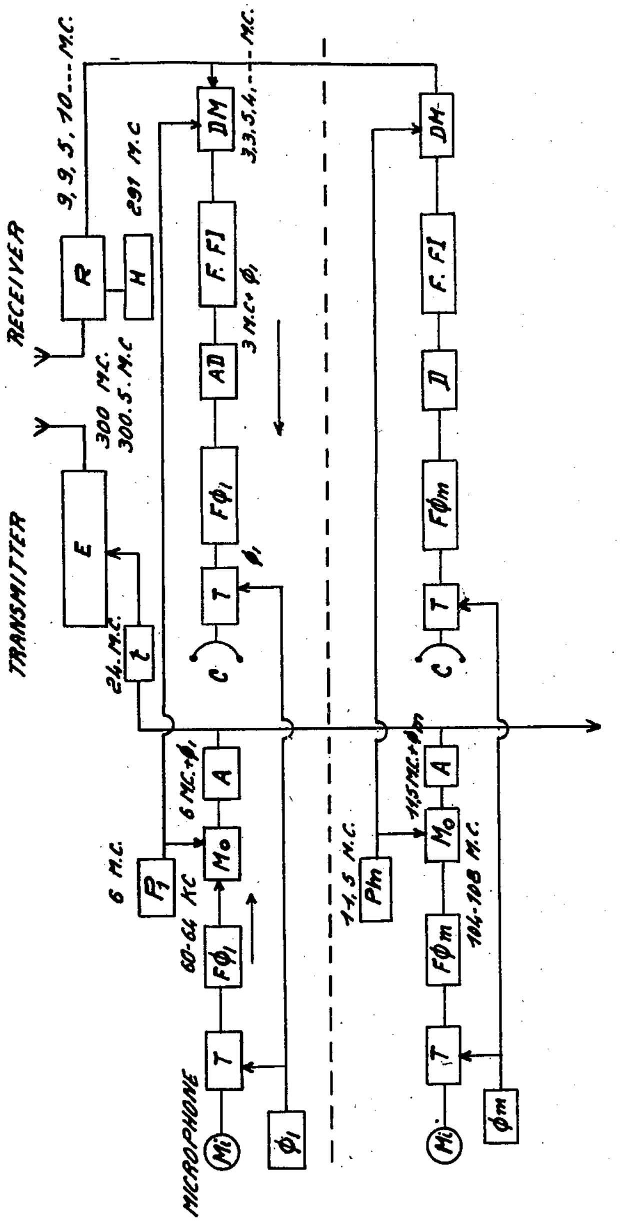
INVENTOR
HENRI CHIREIX
BY
Haseltine, Lake & Co.
AGENTS Patented Dec. 9, 1952 2,621,325

UNITED STATES PATENT OFFICE 2,621,325

PLURAL MODULATION MULTIPLEX SYSTEM

Henri Chireix, Paris, France, assignor to Societe Francaise Radio-Electrique, a corporation of France Application July 30, 1947, Serial No. 764,657
In France August 20, 1946

2 Claims. (Cl. 343—176)

The particular problem which the present invention sets out to solve can be stated as follows:

A number of stations, operating on ultra-short waves and forming a network, have to exchange simultaneously, inter se, a number of communications of varied nature corresponding to different services or "channels." Such communications are usually telephone conversations, but may also be of some other kind (for instance, telegraphic signals, facsimile transmissions, etc.). They are all characterised by a common width of modulation band.

It is, on the other hand, desirable that the band width covered by the network be as small as possible and it is agreed also that no two of the several transmitters should ever operate simultaneously on the same channel. Several transmitters may indeed operate simultaneously, but they must operate on different channels.

The problem to be solved is therefore distinct from that in which a single multiplex connection is provided between two fixed points and it is obvious that, in the present case, there is a risk of violent intermodulation effects being produced, since one or more transmitters located close together and operating, by hypothesis, on one or more different channels, may interfere considerably with the reception of a distant transmitter operating on a given channel, by directly superimposing the corresponding modulations on the said channel. These intermodulation effects are the more intense the smaller the frequency band allotted to the whole network.

This invention relates more particularly to an arrangement such that the diaphonic effects of one channel upon another channel are eliminated, despite the presence of intermodulation, which is regarded as being inevitable, in the absence of efficient protection due to the selectivity at very high frequency.

According to the invention, each channel is characterised by the radiation of an ultra-high-frequency wave, the carrier frequency of which is $(F+P_m)$, $m$ being the given index of a channel of a multiplex system with $n$ channels, said wave itself being modulated (in amplitude, in phase or in frequency) by a telephonic spectrum transposed, in accordance with the technique of carrier currents, by the quantity $\Phi_m$. In other words, to each channel there correspond a given carrier and a given transposition frequency of the speech currents.

After a general demodulation of the complex signal received, there will be found, corresponding to the various channels, modulated waves which are much more widely separated in relative value and which have been modulated by the spectrum which is useful for purposes of reception and also by other spectra due to the intermodulation effects. Selective amplification of the various waves reduces the unwanted waves to a low level, but, as is known, does not affect the intermodulation. Such intermodulation will, nevertheless, be eliminated after detection, at the instant when the various telephone channels are reconstituted in their initial spectra, this being due to the fact that said intermodulation is, in the end, expressed by modulations at frequencies located outside the band-passes of the filters that separate the various transposed channels.

The single figure of the drawing shows an embodiment of the invention.

According to a preferred embodiment of the invention, the ultra-high-frequency spectrum comprises one of the two side bands of a quartz-controlled single band transmitter and is modulated by the intermediate carriers $P_1$, $P_2 \ldots P_k \ldots P_m \ldots P_n$ which are themselves modulated (in amplitude, in phase or in frequency) by the speech bands transposed by the quantities $$\Phi_1 \ldots \Phi_2 \ldots \Phi_k \ldots \Phi_m \ldots \Phi_n$$

If F designates the pilot frequency of the single band transmitter, increased or decreased by the frequency of an additional transposition to which the spectrum aforesaid is subjected, in order to facilitate the selection problems, the radiated waves will actually have carrier frequencies $(F+P_1)$, $$(F+P_2) \ldots (F+P_m) \ldots (F+P_n)$$

for the upper side band. According to the usual technique, $$P_2-P_1=P_3-P_2 \ldots P_{m+1}-P_m=\Delta F=\text{constant}$$

and the intermediate carrier waves themselves may be stabilized by means of quartz crystals.

At the receiving end, after demodulation by means of a common heterodyne H, the following intermediate frequencies will be found:

$F-H+P_1$, modulated by the band transposed by $\Phi_1$ periods per second $F-H+P_2$, modulated by the band transposed by $\Phi_2$ periods per second $F-H+P_m$, modulated by the band transposed by $\Phi_m$ periods per second $F-H+P_n$, modulated by the band transposed by $\Phi_n$ periods per second By arranging, after the general demodulator and in parallel, $n$ demodulators, respectively actuated by the intermediate carriers $P_1$, $P_2$ . . . $P_m$, $P_n$, there will be obtained, inter alia, on all the channels, the intermediate frequency $F-H=FI$.

On the channel 1, there will, in fact, be:

$(F-H)+P_1-P_1=F-H$ mainly modulated by the band transposed $\Phi_1$ periods per second.

On the channel 2, there will be:

$(F-H)+P_2-P_2=F-H$ mainly modulated by the band transposed $\Phi_2$ periods per second; etc.

In this manner, any intermediate frequency amplification can be effected by identical selective amplifiers tuned to the intermediate frequency $F-H=FI$ and having a sufficient band width, which is determined by the highest transposition frequency and the possible derivatives of the transmitted frequencies.

The function of the selection is to prevent, in the various intermediate frequency channels, the amplification of undesirable frequencies such as $(F-H)+P_k-P_m$.

In order to avoid the effects of image frequencies, it is moreover advisable to adopt the rule:

$$F-H\geq\frac{n}{2}(P_{m+1}-P_m)$$

or $$FI\geq\frac{n}{2}f$$

or $$FI\geq\frac{P_{n+1}-P_1}{2}$$

Since each intermediate frequency amplifier is followed by a detector stage, there is found at the output of the detector on channel 1, the modulation transposed by $\Phi_1$ periods per second, plus intermodulation terms corresponding to modulations transposed $\Phi_2$ periods per second, $\Phi_k$ . . . $\Phi_m$ periods per second, and even, in certain cases, $\Phi_k\pm\Phi_m$ periods per second.

On channel 2, likewise, the modulation transposed $\Phi_2$ periods per second, plus intermodulation terms. And similarly for the other channels.

Nevertheless, since, after detection, the reconstitution "in clear" requires a filter which, for channel $m$ is tuned to $\Phi_m$, these terms are eliminated by said filter, particularly if, as it is well known, the various transpositions are effected in the range 1—2, i. e. with $\Phi_n-\Phi_1<\Phi_1$.

Since the various members comprising the whole arrangement are known per se, the accompanying simple single-line diagram will enable the various operations to be followed for a particular embodiment of the invention. By way of indication, numerical values will also be given and, for greater simplicity, it will be assumed that the intermediate carriers are amplitude modulated.

Each channel is provided at the transmitter, with a transposition stage T for the speech currents; said speech currents are transposed, according to the usual technique, by means of the carrier frequency generators $\Phi_1$, $\Phi_2$ . . . $\Phi_m$ . . . $\Phi_n$. For a 12 channel system, these frequencies will be for example 60–64 . . . 104 kilocycles. A local microphone has been shown at Mi.

The transposed currents are filtered by the quartz filters $F\Phi_1$ . . . $F\Phi_m$, which are preferably of the $\pi$ type in order to have a high iterative impedance. $F\Phi_1$ covers the 60–64 kc. band, $F\Phi_2$ the 64–68 kc. band, etc. $F\Phi_n$ covering the 104–108 kc. band.

The intermediate carrier waves are shown at $P_1$, $P_2$ . . . $P_m$. They may, for example, be supplied by quartz crystals and be of the values: 6 megacycles, 6.5 megacycles, 7 megacycles, etc. up to 11.5 megacycles for the 12th channel.

$M_0$ is a modulator to which the carrier and the transposed channel are fed.

A is an amplifying stage which is used at the same time for mixing the various channels.

In order to facilitate the construction of the single-band transmitter, the modulation spectrum extending from 6 to 11.5 mc. is transposed at $t$ by 24 megacycles, for example, so that after transposition, it occupies the 30 to 35.5 mc. band. This spectrum modulates the single band transmitter E, which may be controlled by a quartz crystal, the frequency of which is multiplied up to 270 mc. The radiated spectrum then comprises 12 modulated waves of the frequencies 300; 300.5; 301 . . . 305.5 mc., not including the carrier on 270 mc. and the lower side band.

At the receiving end, the band is demodulated as a whole, by the heterodyne H, the frequency of which is 291 mc., also obtained by means of a quartz crystal, and the frequencies 9; 9.5; 10 . . . 14.5 mc. are thus obtained.

Each receiving channel comprises: (1) A demodulator DM to which the corresponding intermediate carrier is fed. Thus the 9 mc. of channel 1 is demodulated by the 6 mc. intermediate carrier, so as to obtain $FI=3$ mc.; the 9.5 mc. of channel 2 is demodulated by the 6.5 mc. intermediate carrier, so as to obtain $FI=3$ mc., etc.; (2) A filter F.FI of a mean frequency of 3 mc. and passing a band width of ±120 kc. Said filter may also be a quartz filter, preferably of the $\pi$ type; (3) An amplifier-detector AD, operating on the intermediate frequency of 3 mc.; (4) A filter $F\Phi_m$, identical with the one at the transmitting end of the corresponding channel; (5) A transposing stage reconstituting the telephone band in its initial spectrum and directly supplying the headphones C.

It is obvious that, in a case in which frequency modulation is used, apart from the numerical values which have been given by way of an indication, the only modifications would be that, at the transmitter, the modulator $M_0$ would be a phase or a frequency modulator, and at the receiving end, the amplifier-detector AD would comprise a phase or a frequency detector.

I claim:

1. A system having a plurality of stations for the transmission and reception of multiple channel ultra high frequency radio waves, each channel being appropriated to not more than one transmitter at a time, wherein each station comprises a transmitter provided with means for transmitting in a plurality of channels; means for transposing the initial signal spectra each by a fixed frequency, said fixed frequency being different for each channel, the difference between any two of said fixed frequencies being always to or greater than the difference between the highest and the lowest frequencies of the signal spectra transposed thereby; means for modulating waves of intermediate frequency different for each channel by the said transposed signal spectra, the difference between any two successive intermediate frequencies being of such magnitude that the side bands produced on each side of each of the intermediate frequencies by said transposed spectra do not overlap the side bands associated with the other intermediate frequencies; means for transposing the said waves of intermediate frequency thus modulated and their associated side bands by the same high frequency source, the intermediate frequency waves thus transposed constituting a group of separate high frequency channels; means for transposing by the same ultra high frequency source the group of high frequency channels thus produced to produce a carrier wave and associated side bands; and means for transmitting the carrier wave with a single side band thus produced.

2. A system having a plurality of stations for the transmission and reception of multiple channel ultra high frequency radio waves as claimed in claim 1 wherein each station comprises a receiver provided with means for receiving in a plurality of channels; fixed frequency means in said receiver for effecting a first change in frequency in the received waves to bring the received waves to intermediate frequency values; means in each channel for effecting a second change in frequency of the received waves by beating said waves with the intermediate frequency value characteristic of that channel in the transmitter thereby producing a group of intermediate frequencies in each channel; identical filter means in each channel for selecting the same intermediate frequency value in each channel, said same intermediate frequency in each channel carrying a transposed signal spectrum different for each channel; and means in each channel for demodulating and filtering the transposed signal spectrum and for retransposition of the same to its initial value.

HENRI CHIREIX.

REFERENCES CITED

The following references are of record in the file of this patent:

UNITED STATES PATENTS

| Number | Name | Date |
|---|---|---|
| 1,361,488 | Osborne | Dec. 7, 1920 |
| 1,711,679 | Heising | May 7, 1929 |
| 2,104,012 | Armstrong | Jan. 4, 1938 |
| 2,156,278 | Dekker | May 2, 1939 |
| 2,233,183 | Roder | Feb. 25, 1941 |
| 2,246,184 | Peterson | June 17, 1941 |
| 2,284,247 | Bagnall | May 26, 1942 |
| 2,298,409 | Peterson | Oct. 13, 1942 |
| 2,421,727 | Thompson | June 3, 1947 |

FOREIGN PATENTS

| Number | Country | Date |
|---|---|---|
| 733,626 | France | July 12, 1932 |